(12) United States Patent
Sasaoka

(10) Patent No.: US 11,286,000 B2
(45) Date of Patent: Mar. 29, 2022

(54) FRAME VEHICLE

(71) Applicant: Toyota Jidosha Kabushiki Kaisha, Toyota (JP)

(72) Inventor: Hiroyuki Sasaoka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 6 days.

(21) Appl. No.: 16/918,537

(22) Filed: Jul. 1, 2020

(65) Prior Publication Data

US 2021/0016831 A1 Jan. 21, 2021

(30) Foreign Application Priority Data

Jul. 18, 2019 (JP) .............................. JP2019-132827
May 7, 2020 (JP) .............................. JP2020-081809

(51) Int. Cl.
| | |
|---|---|
| *B62D 21/03* | (2006.01) |
| *B62D 21/09* | (2006.01) |
| *B60R 16/04* | (2006.01) |
| *B62D 27/06* | (2006.01) |
| *B62D 21/15* | (2006.01) |
| *B62D 24/00* | (2006.01) |

(52) U.S. Cl.
CPC .............. *B62D 21/03* (2013.01); *B60R 16/04* (2013.01); *B62D 21/09* (2013.01); *B62D 21/152* (2013.01); *B62D 27/065* (2013.01); *B62D 24/00* (2013.01)

(58) Field of Classification Search
CPC ........ B62D 21/02; B62D 21/03; B62D 21/09; B62D 24/00; B62D 24/02; B62D 24/04; B60R 16/04

USPC ....... 280/781, 784, 788, 796, 797, 798, 107; 296/35.1–35.3
See application file for complete search history.

(56) References Cited

U.S. PATENT DOCUMENTS

| | | | |
|---|---|---|---|
| 8,801,072 B2* | 8/2014 | Sasage .................. | B62D 27/04 |
| | | | 296/35.1 |
| 9,840,138 B2* | 12/2017 | Shirai ...................... | F16F 1/37 |
| 2006/0066090 A1 | 3/2006 | Jennings et al. | |
| 2017/0217296 A1 | 8/2017 | Nomura et al. | |

FOREIGN PATENT DOCUMENTS

| | | | |
|---|---|---|---|
| JP | 2005-255036 A | | 9/2005 |
| JP | 4259694 | * | 4/2009 |
| JP | 2009-190523 A | | 8/2009 |
| JP | 2017-077842 A | | 4/2017 |
| JP | 2017-136909 A | | 8/2017 |

OTHER PUBLICATIONS

Jp4259694 Translation (Year: 2009).*

* cited by examiner

*Primary Examiner* — Dennis H Pedder
(74) *Attorney, Agent, or Firm* — Dinsmore & Shohl LLP

(57) ABSTRACT

Provided is a frame vehicle including: a ladder-shaped frame skeleton including side rails and first to ninth crossmembers provided so as to stretch over the side rails; and a body fastened onto cab mounts attached to the side rails. The sixth and seventh crossmembers placed near the cab mounts have curved parts in central parts of the sixth and seventh crossmembers in the vehicle width direction, the curved parts being curved to project upward in the vehicle up-down direction.

2 Claims, 8 Drawing Sheets

SECTION B-B

FRAME VEHICLE

CROSS-REFERENCE TO RELATED APPLICATIONS

This application claims priority to Japanese Patent Application No. 2019-132827 filed on Jul. 18, 2019, and Japanese Patent Application No. 2020-081809 filed May 7, 2020, which are incorporated herein by reference in their entirety including the specifications, drawings and abstracts.

BACKGROUND

1. Technical Field

The present disclosure relates to a structure of a frame vehicle, more specifically to a structure of a frame skeleton of a frame vehicle.

2. Description of Related Art

A frame vehicle in which a body is provided on a ladder-shaped frame skeleton via cab mounts has been used (see Japanese Unexamined Patent Application Publication No. 2017-136909 (JP 2017-136909 A). The frame skeleton is constituted by right and left side rails and a plurality of crossmembers provided to stretch over the side rails.

SUMMARY

The frame vehicle has such a structure that, when the body moves relative to the frame skeleton at the time of a collision, fastening of a fastening member of the cab mount to the body is released, so that an entry stroke of a barrier to the body is reduced. However, in a case of a side collision in which a relative displacement between the body and the frame skeleton is small, the fastening of the fastening member of the cab mount is not released, so that the entry stroke of the barrier to the body may become large.

In view of this, the present disclosure relates to a frame vehicle and is aimed at reducing an entry stroke of a barrier to a body at the time of a side collision.

A frame vehicle of the present disclosure is a frame vehicle including a ladder-shaped frame skeleton and a body. The ladder-shaped frame skeleton includes: a pair of right and left side rails extending in the vehicle front-rear direction; and a plurality of crossmembers extending in the vehicle width direction so as to stretch over the side rails. The body is fastened by fastening members onto cab mounts attached to the side rails. The fastening members are configured to break and release the fastening at a time of a collision. Among the crossmembers, crossmembers placed near the cab mounts have curved parts in central parts of the crossmembers in the vehicle width direction, the curved parts being curved to project upward in the vehicle up-down direction.

When a barrier enters the body in the early stage of a side collision, fastening of the fastening member of the cab mount on a collision side is released. After that, when the barrier enters the side rail, on the collision side, of the frame skeleton, the crossmembers placed near the cab mounts buckle and deform upward in the vehicle up-down direction at the curved parts provided in the central parts of the crossmembers in the vehicle width direction. Hereby, the body is pushed toward an opposite side from the collision side, and a relative displacement between the body and the side rail on the opposite side from the collision side becomes large. As a result, fastening of the fastening member of the cab mount on the opposite side from the collision side is released. Thus, the fastening of the fastening member of the cab mount on the collision side and the fastening of the fastening member of the cab mount on the opposite side from the collision side are released, so that the body is movable relative to the frame skeleton. This makes it possible to reduce an entry stroke of the barrier to the body in the second half of the side collision. Further, impact energy can be absorbed by the crossmembers buckling and deforming upward in the vehicle up-down direction, thereby making it possible to reduce impact force to be applied to an occupant at the time of the side collision.

In the frame vehicle of the present disclosure, the crossmembers placed near the cab mounts may be hat-shaped sectional members or groove-shaped sectional members opened upward in the vehicle up-down direction.

Since the crossmembers placed near the cab mounts are constituted by hat-shaped sectional members or groove-shaped sectional members opened upward in the vehicle up-down direction, the crossmembers placed near the cab mounts can be more easily buckled and deformed upward in the vehicle up-down direction, so that the fastening of the fastening member of the cab mount on the opposite side from the collision side can be released in the early stage of a side collision.

The frame vehicle of the present disclosure may further include a battery provided on a floor panel of the body. The crossmembers placed near the cab mounts may be placed near the cab mounts and below the battery.

This makes it possible to reduce the entry stroke of the barrier to the body in a region where the battery is placed.

The present disclosure relates to a frame vehicle and can reduce an entry stroke of a barrier to a body at the time of a side collision.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

With reference to the drawings, the following describes a frame vehicle 100 of an embodiment. Note that an arrow FR, an arrow UP, and an arrow RH shown in each figure indicate the front side (the advance side) in the vehicle front-rear direction, the upper side in the vehicle up-down direction, and the right side in the vehicle width direction, respectively. Further, directions reverse to the arrows FR, UP, RH indicate the rear side in the vehicle front-rear direction, the lower side in the vehicle up-down direction, and the left side in the vehicle width direction, respectively. Hereinafter, in a case where a description is made by use of merely the front and rear sides, the right and left sides, and the upper and lower sides, they indicate the front and rear sides in the vehicle front-rear direction, the right and left sides in the vehicle right-left direction (the vehicle width direction), and the upper and lower sides in the vehicle up-down direction, respectively, unless otherwise specified. Further, subscripts R, L in reference signs indicate corresponding members placed on the right side and on the left side, respectively.

Figure 1:
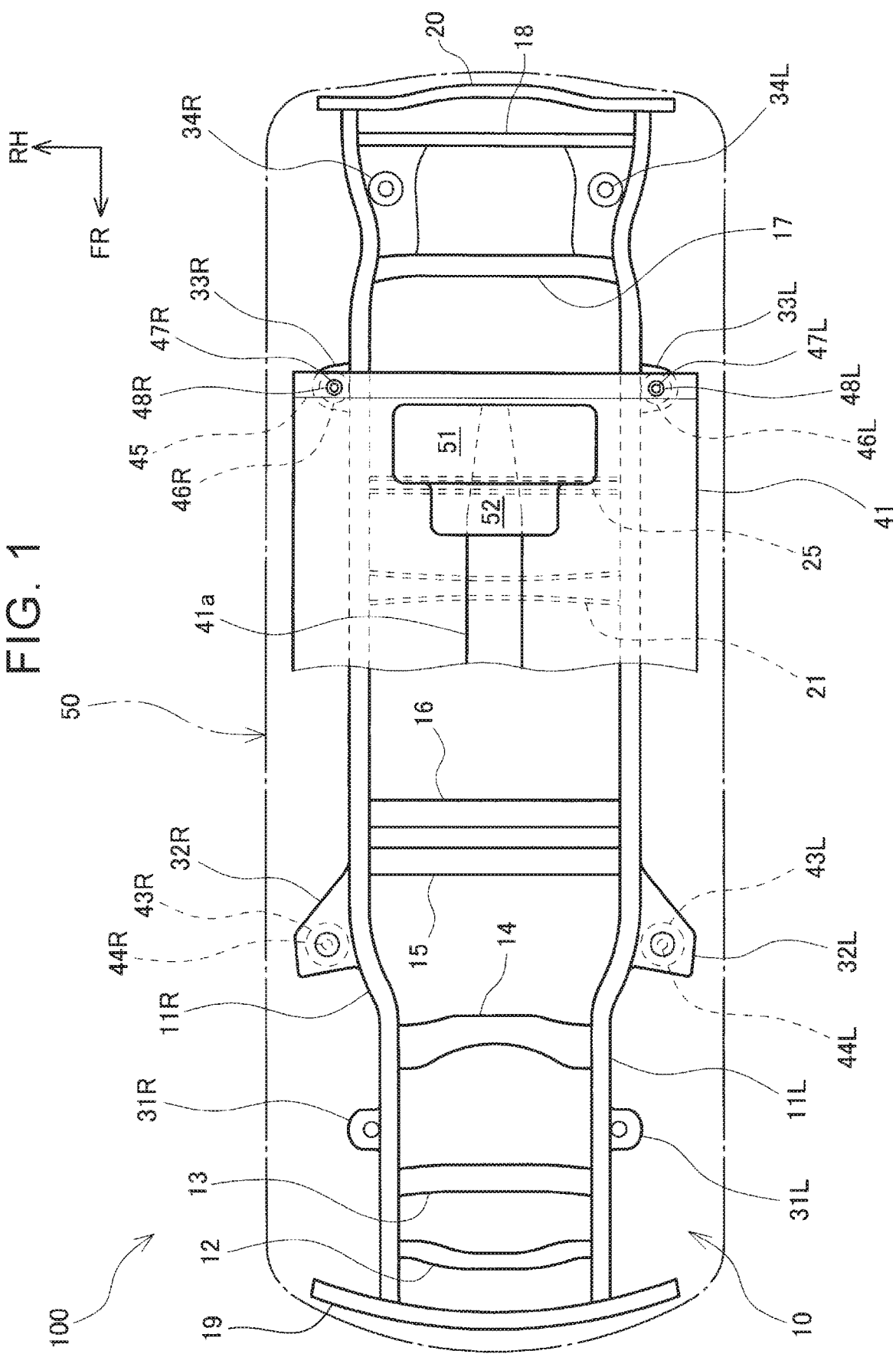
FIG. 1 is a plan view illustrating a frame skeleton of a frame vehicle of an embodiment and a rear part of a floor panel of a body.
Figure 2:
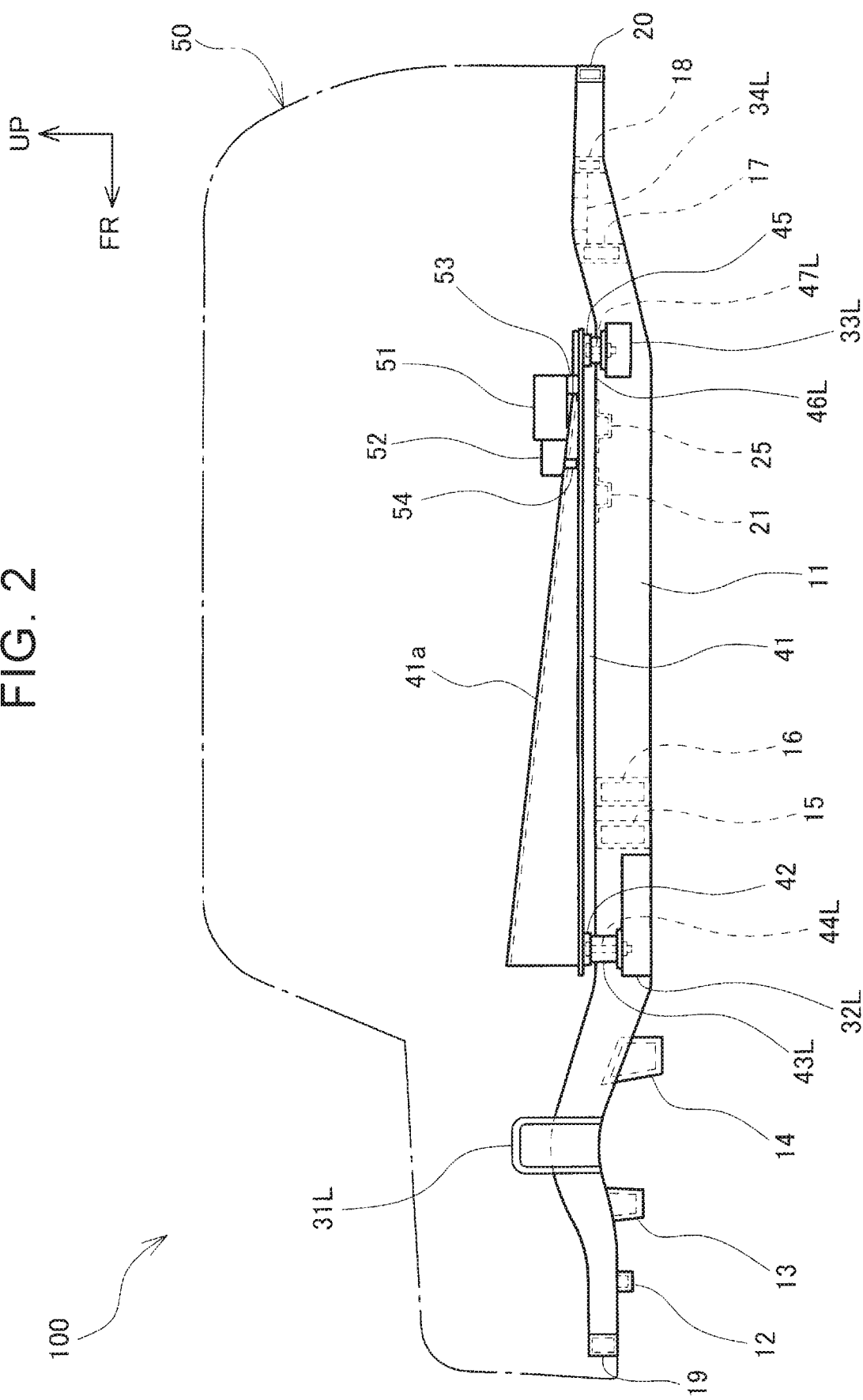
FIG. 2 is a side view illustrating the frame skeleton of the frame vehicle of the embodiment and the floor panel of the body.

As illustrated in FIGS. 1, 2, the frame vehicle 100 of the embodiment includes a ladder-shaped frame skeleton 10 and a body 50 provided on the frame skeleton 10.

The frame skeleton 10 is a ladder-shaped frame member constituted by a pair of right and left side rails 11R, 11L extending in the vehicle front-rear direction, and first to ninth crossmembers 12 to 16, 21, 25, 17, 18 extending in the vehicle width direction so as to stretch over the right and left side rails 11R, 11L. Bumper reinforcements 19, 20 are connected to front and rear ends of the frame skeleton 10, respectively.

Front suspension brackets 31R, 31L to which front-wheel suspension devices are attached are attached to outer sides, in the vehicle width direction, of respective front parts of the right and left side rails 11R, 11L. Further, rear suspension members 34R, 34L to which rear-wheel suspension devices are attached are attached between the eighth crossmember 17 and the ninth crossmember 18 on the rear side.

Front cab mount brackets 32R, 32L to which front cab mounts 43R, 43L are attached are attached to the outer sides, in the vehicle width direction, of respective front parts of the right and left side rails 11R, 11L. The front cab mounts 43R, 43L are configured to support the right and left sides of a front part of the body 50. Outriggers 33R, 33L to which rear cab mounts 46R, 46L are attached are attached to outer sides, in the vehicle width direction, of respective rear parts of the right and left side rails 11R, 11L. The rear cab mounts 46R, 46L are configured to support the right and left sides of a rear part of the body 50.

As illustrated in FIG. 2, the first and second crossmembers 12, 13 are frame members having a square closed-section structure and placed in front of the front suspension brackets 31R, 31L. The third crossmember 14 is a frame member having a square closed-section structure and placed between the front suspension brackets 31R, 31L and the front cab mount brackets 32R, 32L. The fourth and fifth crossmembers 15, 16 are frame members having a square closed-section structure and placed behind the front cab mount brackets 32R, 32L such that the fourth and fifth crossmembers 15, 16 are aligned in the front-rear direction. The eighth and ninth crossmembers 17, 18 are frame members having a square closed-section structure and placed on the rear side of the vehicle. The sixth and seventh crossmembers 21, 25 are placed in front of the outriggers 33R, 33L in the vehicle front-rear direction and near the outriggers 33R, 33L. The sixth and seventh crossmembers 21, 25 are hat-shaped sectional members that are opened upward in the vehicle up-down direction. The seventh crossmember 25 is placed below a battery 51 and a branch box 52 attached on a floor panel 41 to be described later.

As illustrated in FIG. 2, the body 50 includes the floor panel 41 constituting a floor of a vehicle cabin, a front under-crossmember 42 placed on an under surface of a front end of the floor panel 41 and extending in the vehicle width direction, and a rear under-crossmember 45 placed on an under surface of a rear end of the floor panel 41 and extending in the vehicle width direction. Note that other strength members including a rocker and so on that are attached to the floor panel 41 are not illustrated and described herein. The floor panel 41 includes a floor tunnel portion 41a extending in the vehicle front-rear direction. The floor tunnel portion 41a has a groove-shaped section projecting upward and is provided in the center of the floor panel 41 in the vehicle width direction. The battery 51 and the branch box 52 are attached to a top face of a rear part of the floor panel 41 via mounting brackets 53, 54. The battery 51 and the branch box 52 are placed above the seventh crossmember 25.

As described above, the right and left front cab mounts 43R, 43L are attached to the right and left front cab mount brackets 32R, 32L. Right and left ends of the front under-crossmember 42 of the floor panel 41 are provided on the right and left front cab mounts 43R, 43L, respectively, and are fastened to the right and left front cab mounts 43R, 43L by bolts 44R, 44L as fastening members. Similarly, right and left ends of the rear under-crossmember 45 of the floor panel 41 are provided on the right and left rear cab mounts 46R, 46L, respectively, and are fastened to the right and left rear cab mounts 46R, 46L by bolts 47R, 47L as fastening members passed through bolt holes 48R, 48L (see FIG. 1) provided in the rear under-crossmember 45.

Figure 3:
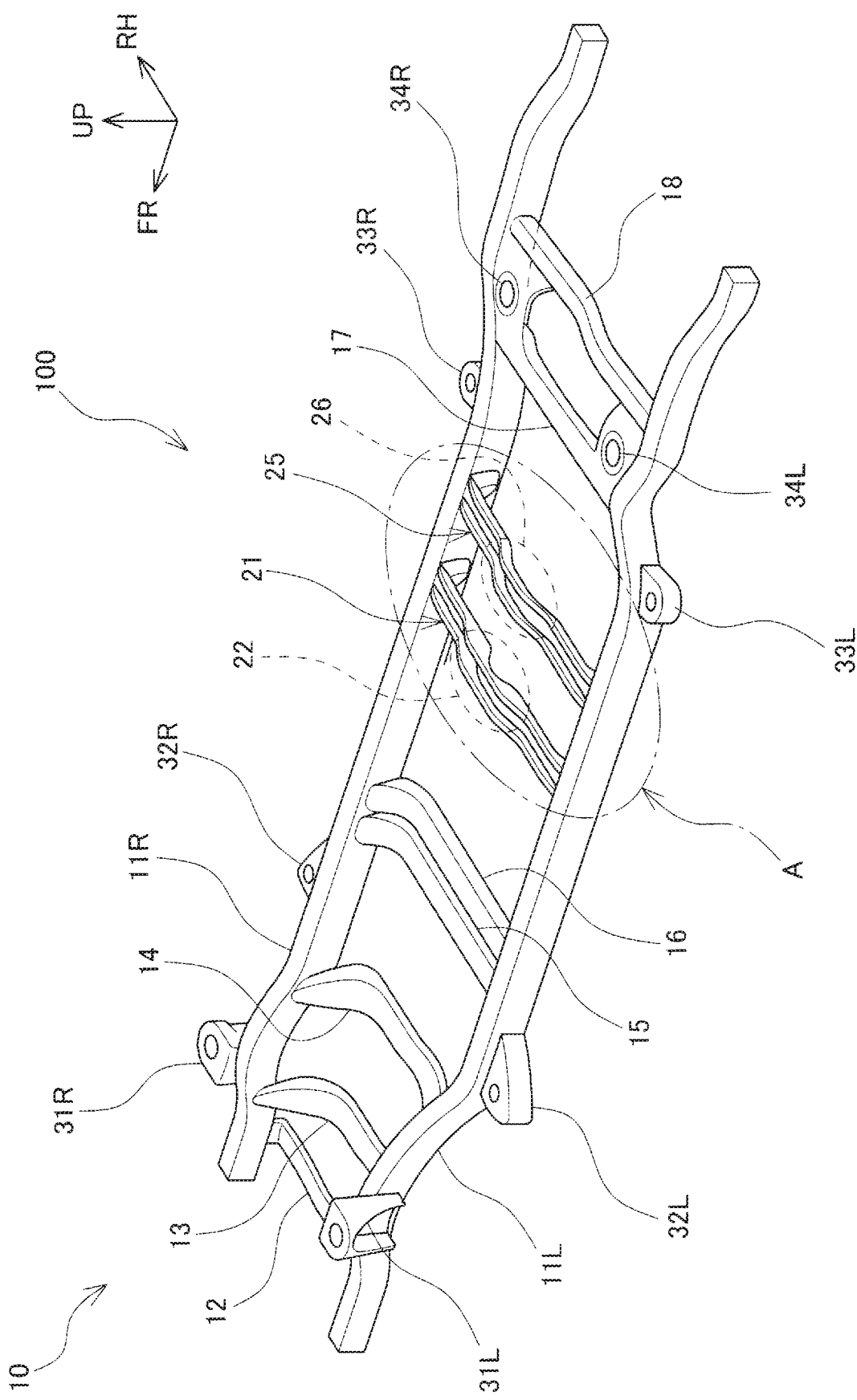
FIG. 3 is a perspective view illustrating the frame skeleton of the frame vehicle of the embodiment.
Figure 4:
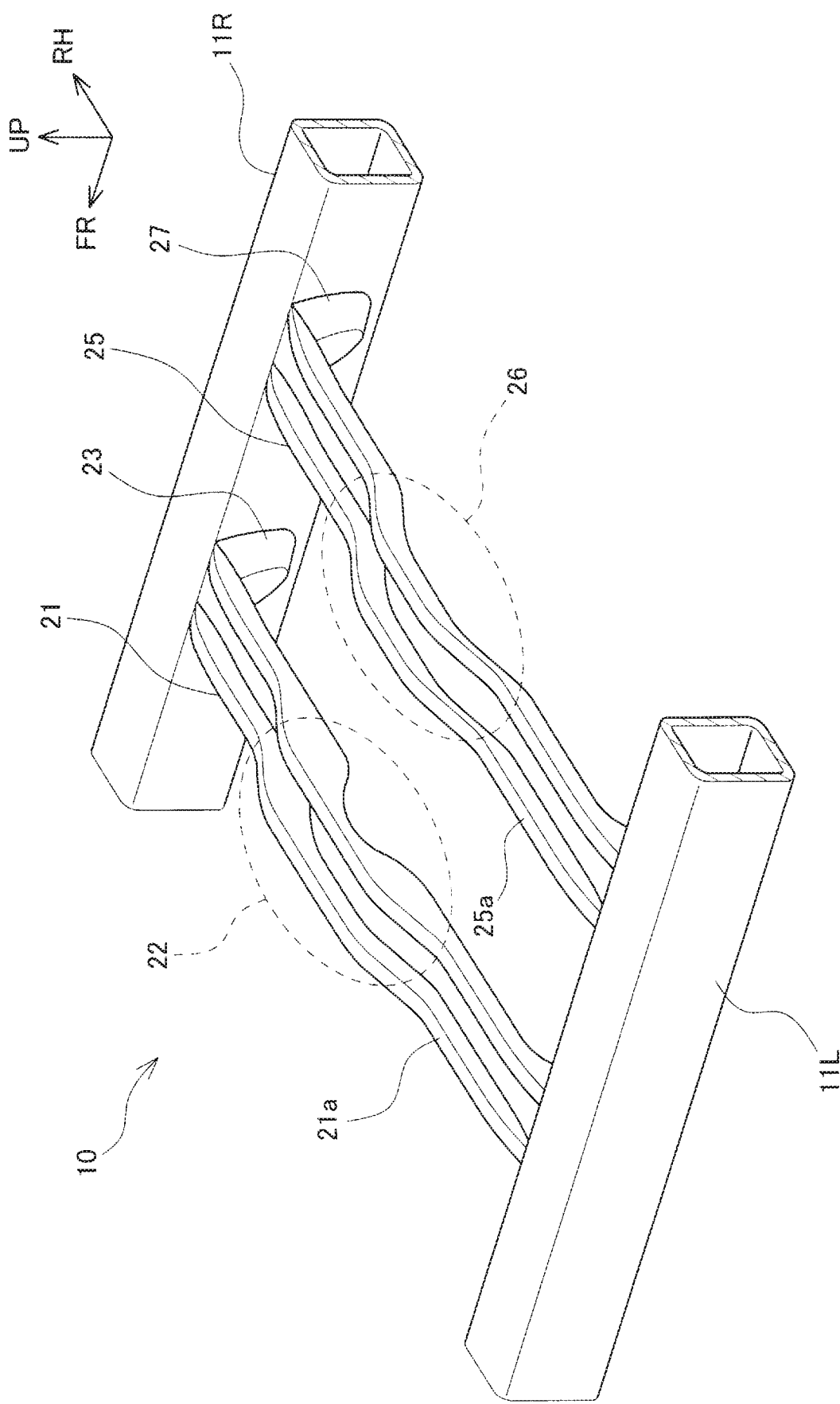
FIG. 4 is a detailed perspective view of a part A illustrated in FIG. 3.
Figure 5:
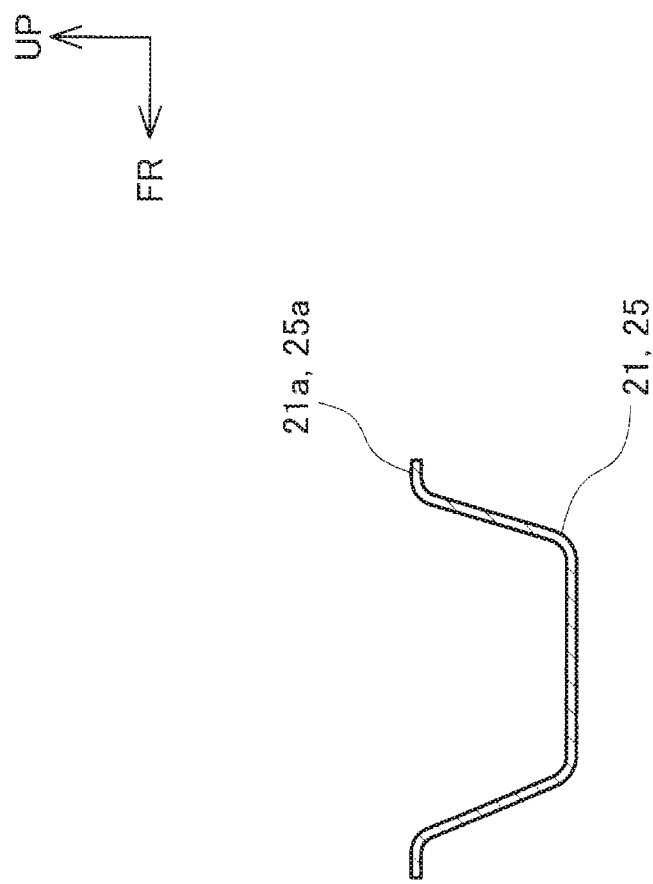
FIG. 5 is a sectional view of a crossmember placed near a cab mount.

As illustrated in FIGS. 3, 4, the sixth and seventh crossmembers 21, 25 have curved parts 22, 26 in their central parts in the vehicle width direction. The curved parts 22, 26 are curved to project upward in the vehicle up-down direction. Since the sixth and seventh crossmembers 21, 25 have the same sectional shape, they are described by assigning different reference signs to a common sectional shape in FIG. 5. As illustrated in FIG. 5, the sixth and seventh crossmembers 21, 25 are hat-shaped sectional members that are opened upward in the vehicle up-down direction. Lips 21a, 25a are provided on an open side of the sixth and seventh crossmembers 21, 25. The reason why the open side of the sixth and seventh crossmembers 21, 25 is the upper side in the vehicle up-down direction is because the curved parts 22, 26 can be easily buckled and deformed upward at the time of a side collision in collaboration with the shape of the curved parts 22, 26 projecting upward. As illustrated in FIG. 4, the sixth and seventh crossmembers 21, 25 are connected to the right and left side rails 11R, 11L by brackets 23, 27 provided at both ends of the sixth and seventh crossmembers 21, 25 so that top faces of the lips 21a, 25a are placed at generally the same height as top faces of the right and left side rails 11R, 11L.

The deformation of each part in a case where the frame vehicle 100 configured as above has a side collision will be described with reference to FIGS. 6 to 8. The following description deals with a case where the right side of the vehicle near the sixth and seventh crossmembers 21, 25 has a side collision with a pole 80. The right side of the vehicle is a collision side, and the left side of the vehicle is an opposite side from the collision side.

Figure 6:
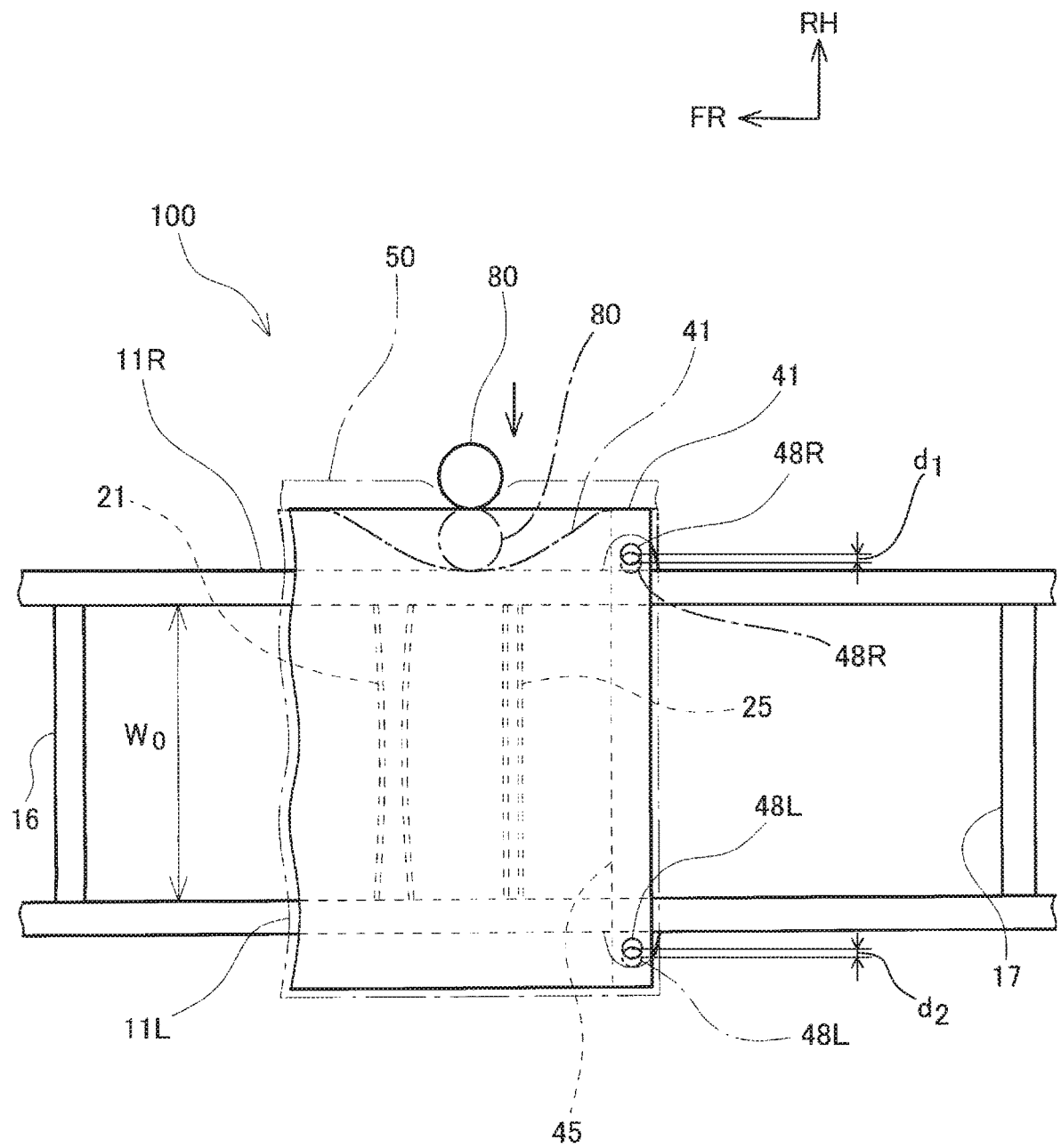
FIG. 6 is a plan view illustrating an initial state of a side collision of the frame vehicle of the embodiment.

As illustrated in FIG. 6, when the right side of the vehicle has a side collision with the pole 80, the pole 80 enters the right side of the body 50 as illustrated in the pole 80 indicated by an alternate long and short dash line. Then, as illustrated in the floor panel 41 indicated by an alternate long and short dash line, the right side of the floor panel 41 is greatly deformed, and the pole 80 enters the right side of the body 50 and comes close to the right side of the side rail 11R. On this occasion, the position of the bolt hole 48R indicated by a continuous line and provided in a right end of the rear under-crossmember 45 of the floor panel 41 is displaced to the left side only by a distance d1 relative to the side rail 11R as illustrated in the bolt hole 48R indicated by an alternate long and short dash line. Further, the position of the bolt hole 48L indicated by a continuous line and provided in a left end of the rear under-crossmember 45 is displaced to the left side only by a distance d2 relative to the side rail 11L as illustrated in the bolt hole 48L indicated by an alternate long and short dash line. Since the distance d1 and the distance d2 are each smaller than the breakage displacement ds, the bolt 47R on the right side and the bolt 47L on the left side do not break although the bolt 47R and the bolt 47L incline due to the displacements of the positions of the bolt holes 48R, 48L.

When the pole 80 enters the right side rail 11R due to the side collision, the pole 80 pushes and deforms the right side rail 11R to the left side as illustrated in the pole 80 indicated by an alternate long and short dash line. At this time, as illustrated in the side rail 11R indicated by the alternate long and short dash line, the side rail 11R moves to the left side between the fifth crossmember 16 and the eighth crossmember 17 that are square closed-section members and do not buckle. At this time, as illustrated in FIG. 8, the curved part 26 in the center of the seventh crossmember 25 buckles and deforms upward as illustrated in the curved part 26 indicated by an alternate long and short dash line. Further, although not illustrated herein, the curved part 22 in the center of the sixth crossmember 21 also buckles and deforms upward in a similar manner. Hereby, the distance between the right and left side rails 11R, 11L in a region where the sixth and seventh crossmembers 21, 25 are placed is reduced to W1 from W0 that is an original distance. The region is near the rear cab mounts 46R, 46L. On this account, the left side of the floor panel 41 is pushed to the left side in the vehicle width direction as illustrated in the floor panel 41 indicated by an alternate long and short dash line. Hereby, the position of the bolt hole 48L indicated by a continuous line and provided in the left end of the rear under-crossmember 45 is displaced to the left side only by a distance d4 relative to the side rail 11L as illustrated in the bolt hole 48L indicated by an alternate long and short dash line. Since the distance d4 is larger than the breakage displacement ds, the left bolt 47L breaks. Hereby, fastening between the left end of the rear under-crossmember 45 and the rear cab mount 46L is released.

Figure 7:
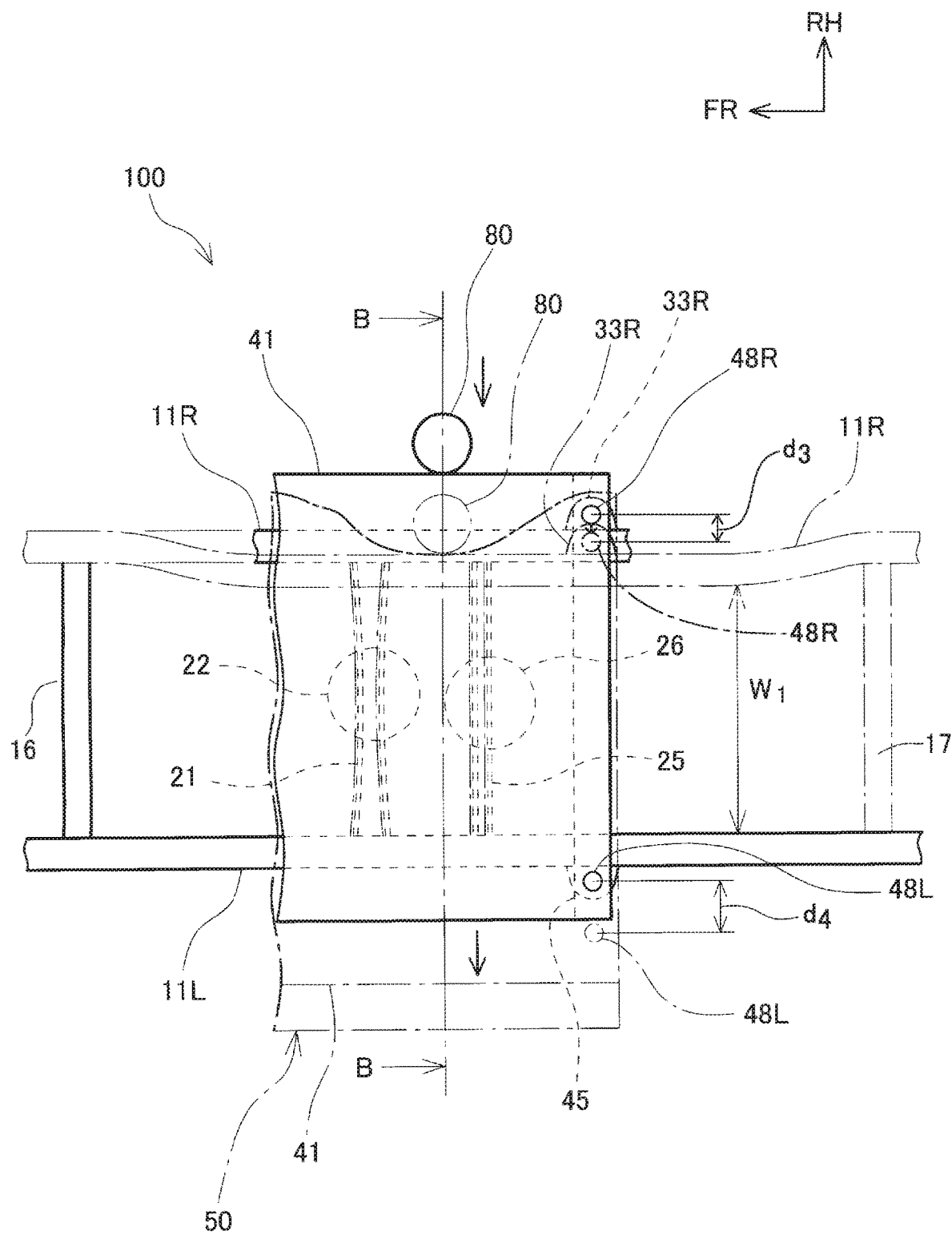
FIG. 7 is a plan view illustrating the second half of the side collision of the frame vehicle of the embodiment.
Figure 8:
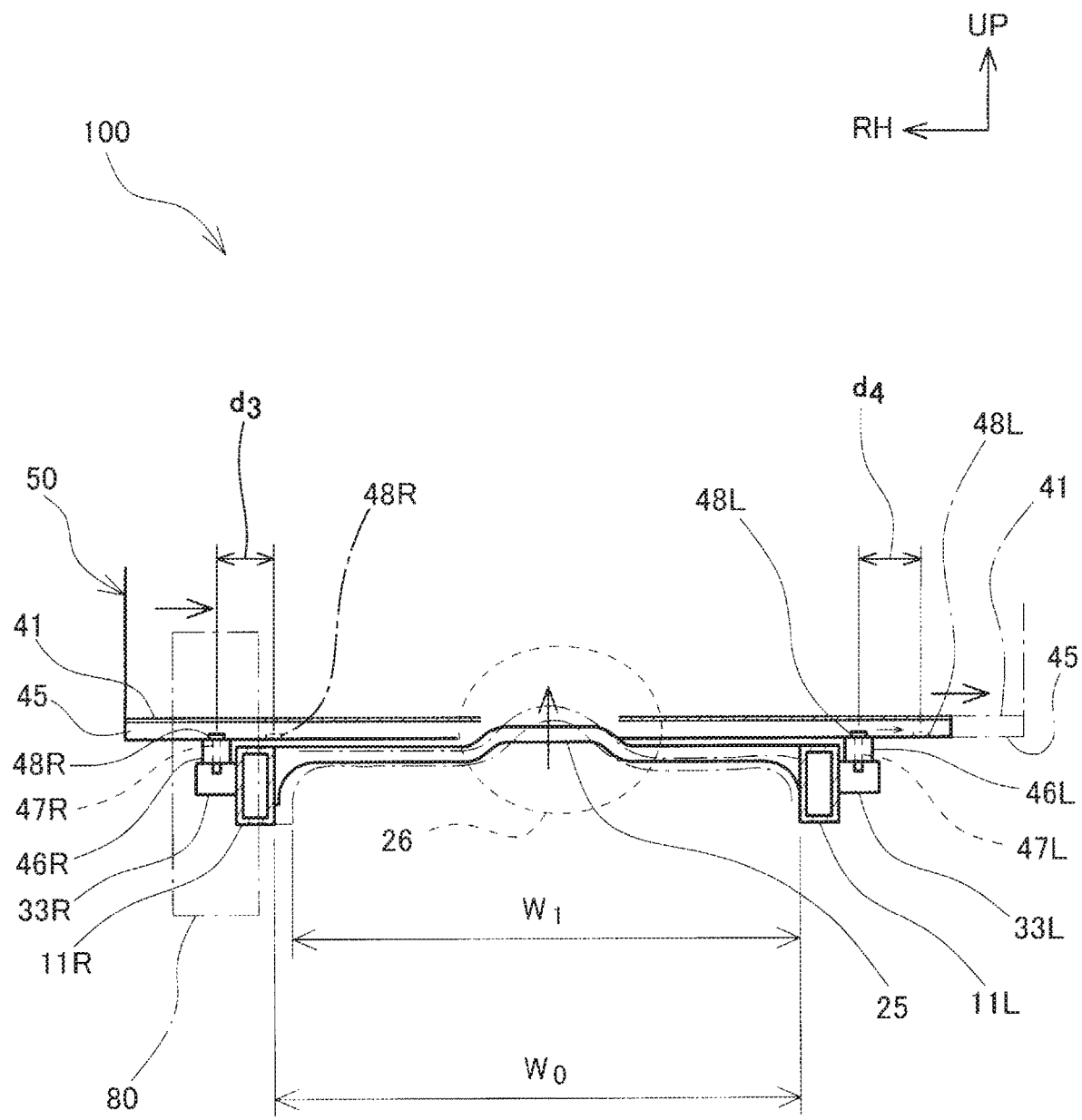
FIG. 8 illustrates a section B-B illustrated in FIG. 7.

On this occasion, the position of the bolt hole 48R on the right side is displaced to the left side only by a distance d3 relative to the side rail 11R as illustrated in the bolt hole 48R indicated by an alternate long and short dash line in FIG. 7. Since the distance d3 is smaller than the breakage displacement ds, the bolt 47R on the right side do not break yet. Then, when the pole 80 further enters the body 50, the distance d3 reaches the breakage displacement ds and the bolt 47R on the right side breaks.

When the right and left bolts 47R, 47L break, the rear part of the body 50 is movable relative to the frame skeleton 10. Accordingly, the body 50 escapes from the pole 80 to the left side in the second half of the side collision. On this account, an entry stroke of the pole 80 to a side face of the rear part of the body 50 in the second half of the side collision can be reduced. Further, the battery 51 and the branch box 52 are provided on the floor panel 41 above the seventh crossmember 25. Accordingly, the frame vehicle 100 of the embodiment can reduce the entry stroke of the pole 80 to a region, in the body 50, where the battery 51 and the branch box 52 are provided at the time of the side collision.

As described above, in the frame vehicle 100 of the embodiment, the sixth and seventh crossmembers 21, 25 that can buckle and deform upward are placed near the rear cab mounts 46R, 46L. Accordingly, fastening between the body 50 and the right and left side rails 11R, 11L can be released in the early stage of the side collision. Hereby, the entry stroke of the pole 80 to the side face of the rear part of the body 50 in the second half of the side collision can be reduced.

Further, when the pole 80 enters the right side rail 11R, the sixth and seventh crossmembers 21, 25 buckle and deform upward so as to absorb impact energy. Accordingly, impact force to be applied to an occupant or a member provided on the floor panel 41 at the time of a side collision can be reduced.

The embodiment described above deals with a case where the sixth and seventh crossmembers 21, 25 are hat-shaped sectional members that are opened upward. However, the applicable embodiment is not limited to this. The sixth and seventh crossmembers 21, 25 may be constituted by groove-shaped sectional members opened upward. The sixth and seventh crossmembers 21, 25 may be constituted by closed-section members having a rigidity that allows the curved parts 22, 26 to buckle and deform upward at the time of a side collision, in cooperation with the shape of the curved parts 22, 26 that are convex upward. Further, the above embodiment deals with a case where the seventh crossmember 25 is placed below the battery 51 and the branch box 52. However, the applicable embodiment is not limited to this. The seventh crossmember 25 may not be placed below the battery 51, provided that the seventh crossmember 25 is placed near the outriggers 33R, 33L to which the rear cab mounts 46R, 46L are attached.

Further, the above embodiment deals with a case where the floor panel 41 is fastened to the rear cab mounts 46R, 46L by the bolts 47R, 47L. However, members by which the floor panel 41 is fastened to the rear cab mounts 46R, 46L are not limited to the bolts, provided that the members can break and release the fastening at the time of a collision. The floor panel 41 may be fastened to the rear cab mounts 46R, 46L by use of rods or the like.

What is claimed is:
1. A frame vehicle comprising:
 a ladder-shaped frame skeleton including
  a pair of right and left side rails extending in a vehicle front-rear direction, and
  a plurality of crossmembers extending in a vehicle width direction so as to extend between the side rails; and
 a body fastened by fastening members onto a pair of front cab mounts and a pair of rear cab mounts, each of the pair of front cab mounts and the pair of rear cab mounts are attached to the side rails, the fastening members being configured to break and release the fastening at a time of a collision,
 wherein, among the crossmembers, a pair of crossmembers positioned between the pair of front cab mounts and the pair of rear cab mounts and positioned closer to the pair of rear cab mounts than the pair of front cab mounts are curved crossmembers, the curved crossmembers have curved parts in central parts of the curved crossmembers in the vehicle width direction, the curved parts being curved to project upward in a vehicle up-down direction, and wherein the curved crossmembers are hat-shaped sectional members that open in the vehicle up-down direction.

2. The frame vehicle according to claim 1, comprising a battery provided on a floor panel of the body, wherein the curved crossmembers are positioned below the battery in the vehicle up-down direction.

* * * * *